US012662760B2

(12) United States Patent (10) Patent No.: US 12,662,760 B2
Angelico (45) Date of Patent: Jun. 23, 2026

(54) PLANT FOR MAKING SPUNBOND TYPE POLYMERIC FILAMENT

(71) Applicant: FRATELLI CECCATO MILANO S.R.L, Milan (IT)

(72) Inventor: Giuseppe Angelico, Teramo (IT)

(73) Assignee: FRATELLI CECCATO MILANO S.R.L., Milan (IT)

( * ) Notice: Subject to any disclaimer, the term of this patent is extended or adjusted under 35 U.S.C. 154(b) by 243 days.

(21) Appl. No.: 18/059,580

(22) Filed: Nov. 29, 2022

(65) Prior Publication Data

US 2023/0203728 A1 Jun. 29, 2023

(30) Foreign Application Priority Data

Dec. 29, 2021 (IT) .......................... 102021000032978

(51) Int. Cl.
*D04H 3/16* (2006.01)
*B29C 48/00* (2019.01)
(Continued)

(52) U.S. Cl.
CPC ........... *D04H 3/16* (2013.01); *B29C 48/0021* (2019.02); *B29C 48/05* (2019.02); *B29C 48/16* (2019.02);
(Continued)

(58) Field of Classification Search
CPC ......... D01D 4/06; D01D 4/08; B29C 48/345; B29C 48/05
See application file for complete search history.

(56) References Cited

U.S. PATENT DOCUMENTS 4,104,015 A * 8/1978 Meyer ...................... D01D 4/00
425/464
4,728,472 A * 3/1988 Windley ................ D01D 5/247
264/210.8
(Continued)

FOREIGN PATENT DOCUMENTS

GB 1235338 A 6/1971
IT 201900010044 A1 12/2020

OTHER PUBLICATIONS

Italian Search Report for corresponding Italy Application No. IT202100032978 filed Dec. 29, 2021.

*Primary Examiner* — Joseph S Del Sole
(74) *Attorney, Agent, or Firm* — Vorys, Sater, Seymour and Pease LLP; Maryellen Feehery Hank; Anthony P. Venturino

(57) ABSTRACT
A plant for making spunbond type polymeric filament defining an extrusion direction and including, in order along the extrusion direction, an extrusion head including at least one main channel to allow the passage of polymeric fluid through the extrusion head, a distributor including at least one distribution conduit in fluid passage connection with the main channel to distribute the fluid, at least one spinneret having holes each running parallel to the extrusion direction in fluid passage connection with the distribution conduit and suitable for extruding the fluid to make a respective polymeric filament, at least one distribution tank between the distributor, downstream of the conduit, and the spinneret, upstream of the holes, connecting, in fluid passage connection, the conduit and holes and defining a first thickness along the extrusion direction between 3 and 5 mm.

18 Claims, 1 Drawing Sheet

(51) Int. Cl.
  *B29C 48/05*       (2019.01)
  *B29C 48/16*       (2019.01)
  *B29C 48/29*       (2019.01)
  *B29C 48/345*     (2019.01)
  *D04H 3/03*       (2012.01)

(52) U.S. Cl.
  CPC ............ *B29C 48/29* (2019.02); *B29C 48/345*
                  (2019.02); *D04H 3/03* (2013.01)

(56)              References Cited

U.S. PATENT DOCUMENTS

2017/0306527 A1*   10/2017   Taylor ..................... B29C 48/05
2020/0181805 A1*   6/2020   Angelico ................ D01D 4/06

\* cited by examiner

PLANT FOR MAKING SPUNBOND TYPE POLYMERIC FILAMENT

FIELD OF THE INVENTION

The present invention relates to a plant for making spunbond type polymeric filament of the type specified in the preamble to the first claim.

In other words, the present invention has as its object a device for making polymeric filaments extruded by means of at least part of said device and intended for making non-woven type fabric.

BACKGROUND OF THE INVENTION

As is well known, non-woven fabric, or TNT, is an industrial product similar to a textile but obtained by processes other than weaving and knitting. Therefore, within a non-woven fabric, the fibres present a random pattern, with no ordered structure identified, whereas in a woven fabric, the fibres present two prevailing and orthogonal directions, usually called warp and weft.

At present, a plurality of products containing TNT are produced, depending on the manufacturing technique used, which is mainly connected to the use of the product itself.

A distinction is made, in particular, between high quality non-woven fabrics for hygienic products and low quality non-woven fabrics used mainly for geotex.

From a technical point of view, the TNT fabrics, also known by the anglophone term non-woven fabric, can basically be divided into spunlace, spunbond and melt-blown. The spunlace fabric undergoes processing that gives the material equidirectional strength. Thanks to this property, to the possibility of being produced in different materials such as viscose, polyester, cotton, polyamide and microfibre, to the two possible finishes, i.e. smooth or perforated, and to the multitude of smooth or printed colours, spunlance is suitable for the hygienic-sanitary sector, as well as for the automotive, cosmetic, industrial or disposable sectors.

The spunbond, usually made from polypropylene, is a non-woven fabric with many applications in the agricultural, sanitary, construction, furniture, mattress and other related sectors. Through appropriate treatment, a series of highly specific products can be produced for each sector: fluorescent, soft calendared, anti-mite, flame retardant, antibacterial, anti-static, anti-UV and others. Numerous finishes such as printed, laminated, flexo-printed and self-adhesive can also be applied to the Spundbond.

The spundbond non-woven production plants traditionally consist of components as depicted in FIG. 2.

In particular, the plant essentially includes at least one polymer input conduit, a polymer extrusion head, a polymer distributor or breaker plate and a spinneret for making the actual spundbond yarn which is deposited on a conveyor belt.

These elements are each arranged consequently and adjacent to each other in such a way as to allow the polymer to be processed and the TNT spundbond to be distributed. More in detail, the polymer inside the feeding conduit is pushed under pressure and at a high temperature, usually above 200° C., towards the extrusion head. In this regard, a pressure control, e.g. by means of a pressure switch, is usually carried out to guarantee the continuity of the yarn at the outlet and the precision of the deposition process. The extrusion head distributes the polymer along a distribution surface through which the melted polymer reaches the distributor. Between the distributor, or breaker plate, and the extrusion head is a filter consisting of a steel foil with a thickness usually varying between 0.8 and 1.6 mm and including fine meshes with a nominal size between 20 and 110 μm. Essentially, therefore, the above-mentioned filter is a stretched mesh. Following the passage through the filter, the melted polymer enters the distributor that accompanies the polymer to the spinneret where the polymer is extruded into filaments constituting the TNT spundbond.

More specifically, the filter has the purpose of blocking particles or pigments of polymer, which are not perfectly melted or in any case bigger, and which on entering the spinneret could obstruct the extremely small TNT extrusion holes.

The melt-blown TNT is produced by means of specific spinnerets in order to achieve higher technical characteristics than the previous TNT. In fact, the melt-blown fabric is characterised by fibres with a high filtering power for both liquid and aeriform substances.

The known technique described includes some important drawbacks.

In particular, the spunbond plants of the known technique usually result in the formation of droplets, at the exit of the spinneret, which do not contribute to the polymeric filament and, therefore, to the non-woven fabric as a whole.

Therefore, a further drawback of common spunbond polymeric filament production plants is the fact that the polymer waste, in the form of droplets, is by no means negligible and has a very significant impact both in terms of disposal and economically.

SUMMARY OF THE INVENTION

In this situation, the technical task at the basis of the present invention is to devise a spunbond type polymeric filament production plant capable of substantially obviating at least part of the aforementioned drawbacks.

In the context of said technical task, it is an important scope of the invention to obtain a plant for making spunbond type polymeric filament capable of substantially reducing droplet formation at the spinneret exit.

A further important scope of the invention is to achieve a plant for making spunbond type polymeric filament which also enables a consequent reduction in production waste.

In conclusion, a further task of the invention is to realise a plant for making spunbond type polymeric filament which is more environmentally friendly and economical.

The specified technical task and purposes are achieved by a plant for making spunbond type polymeric filament as claimed.

Preferred technical solutions are highlighted in the dependent claims.

BRIEF DESCRIPTION OF THE DRAWINGS

The features and advantages of the invention are hereinafter clarified by the detailed description of preferred embodiments of the invention, with reference to the appended drawings, in which.

DETAILED DESCRIPTION OF PREFERRED EMBODIMENTS

Figures 1, 2:
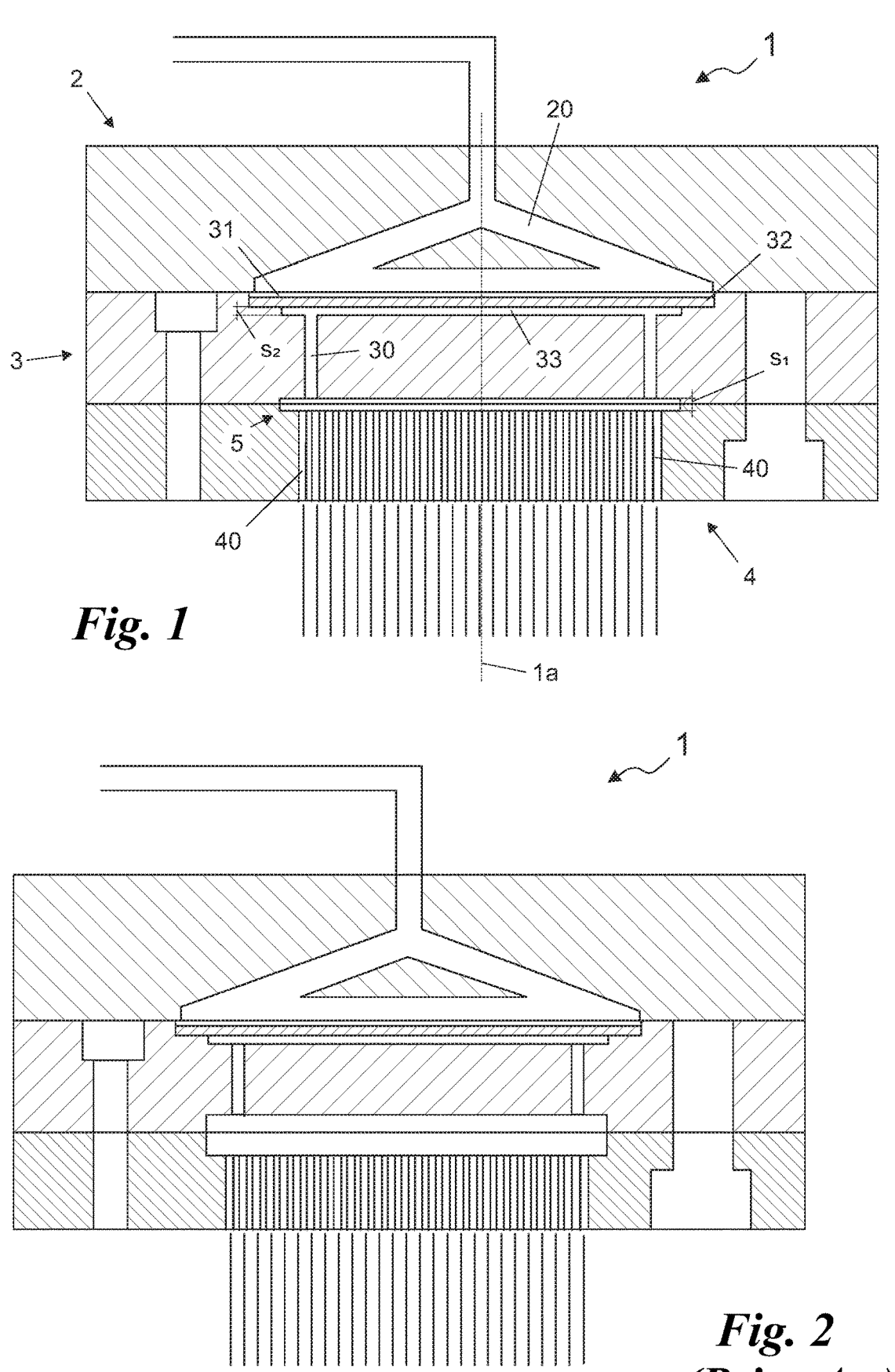
FIG. 1 shows a cross-sectional view of a plant for making spunbond type polymeric filament according to the invention.
FIG. 2 illustrates a plant for making spunbond type polymeric filament of the known technique.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the plant for making spunbond type polymeric filament according to the invention is globally referred to by the number 1.

Thus, the plant 1 is preferably configured for making non-woven fabric on the basis of the spunbond technology. The latter, substantially, involves extruding the melt polymeric material by means of a plurality of micrometer-sized nominal holes suitable for distributing the polymeric filaments directed towards a conveyor belt.

The plant 1 thus globally defines an extrusion direction 1a.

The extrusion direction 1a is the direction along which, or parallel to which, the polymeric filaments are deposited on the conveyor belt. Substantially, therefore, the extrusion direction 1a is preferably parallel to the direction defined by gravitational acceleration.

The plant 1 comprises at least one extrusion head 2, a distributor 3 and a spinneret 4.

In particular, the plant 1 comprises the extrusion head 2, the distributor 3 and the spinneret 4, preferably in this order, along the extrusion direction 1a.

Then, the polymeric fluid is introduced into the extrusion head 2, then into the distributor 3 and then distributed into the spinneret 4.

Preferably, the polymeric fluid is a choice of polypropylene, polyester, nylon, cellulose, polyester and viscose.

Preferably, the extrusion head 2 is substantially a common extrusion head, for example, known as a coat-hanger as seen in FIG. 1

Preferably, the extrusion head 2 is suitable for directing a polymeric fluid to the distributor 3. Therefore, preferably, the extrusion head 2 includes at least one main channel 20.

The main channel 20 is a hole or conduit of any shape and size, and may therefore be cylindrical or squared in accordance with the other elements to which the main channel 20 interfaces.

Preferably, the main conduit 20 is suitable for allowing polymeric fluid to flow through the extrusion head 2. In particular, the main conduit 20 is suitable for allowing polymeric fluid to flow towards the distributor 3. Of course, the extrusion head 2 could also comprise a plurality of main conduits 20.

The distributor 3, as mentioned above, receives polymeric fluid from the extrusion head 2, in particular from the main channel(s) 20, for distribution.

The distributor 3 is also defined as a breaker-plate.

It therefore includes at least one distribution conduit 30.

The distribution conduit 30 is in fluid passage connection with the main channel 20 and is suitable for distributing the polymeric fluid. In detail, the distribution conduit 30 distributes the polymeric fluid to the spinneret 4 for making, for example, TNT.

Both the main conduit 20 and the distributor conduit 30 can define complex shapes. Furthermore, they may split and provide sub-channels for distribution of the polymeric fluid. In other words, the distributor 3 may also include a plurality of distribution conduits 30 arranged downstream of the main channel 20 and suitable, each, for distributing smaller amounts of polymeric fluid than the main channel 20.

The distributor 3 preferably includes at least one housing 31 and filter means 32. Said seat 31 is, preferably, adjacent to the extrusion head 2 and arranged between the main channel 20 and the distribution conduit 30.

More specifically, the housing 31 may be obtained on the distributor 3 in the interface area with the extrusion head 2.

The distributor 3 may thus include a single housing 31 or may have a plurality of adjacent housings 31 distributed along the distributor 3 transversely to the extrusion direction 1a.

The filter means 32 are preferably housed in the housing 31.

The housing 31 is, therefore, substantially a tank within which the filtering means 32 may be supported. The latter are preferably arranged between the main channel 20 and the distribution conduit 30, i.e. preferably in the housing 31, so as to filter the polymeric fluid.

The filter means 32, in particular, preferably include a porous element.

The porous element defines a plurality of non-rectilinear and irregularly sized passageways.

It is substantially structurally similar to a sponge. In this sense, the porous element is not intended to be soft and easily deformed. On the contrary, the porous element is preferably defined in terms of stiffness and hardness by its materials and manufacturing processes.

However, the porous element also includes, like sponges, a plurality of pores that make the porous element itself substantially inhomogeneous and anisotropic.

In particular, preferably, the porous element is an element made by the sintering technique.

The latter, due to the manufacturing process, preferably comprises a plurality of non-rectilinear passageways of varying sizes.

The term dimensions refers to all dimensions that contribute to the volumetric determination of the cavities or pores characterising the porous element.

More in detail, preferably, the filter means 32 comprise a plurality of pores, or cavities, defining passageways when adjacent. In other words, the consequentiality of the pores realises the passage channels for the polymeric fluid.

Furthermore, preferably, each of the pores has a porosity greater than or equal to 18 $\mu$m.

As mentioned above, the porous element is preferably processed by sintering and, therefore, comprises a plurality of mutually sintered particles of the same material.

The particles can thus be of any material, as long as they are resistant to the passage of the polymeric fluid. For example, the porous element comprises metallic material.

Furthermore, the sintered particles can be of a different nature.

For example, in a first embodiment, the particles can be either spheres or fragments.

In a second embodiment, the porous element may comprise mutually interwoven, sintered filaments.

In a third embodiment, the porous element may include a first layer and a second layer.

These layers are preferably mutually overlapping and include respectively components and filaments as previously described. In detail, preferably, the first layer and the second layer are respectively adjacent to the extrusion head 2 and the distributor 3, alternatively they are respectively adjacent to the distributor 3 and the extrusion head 2.

Furthermore, sintering in a single layer of both particles and filaments may be provided. The porous element can thus be made in one piece with the distributor 3 or, preferably, is removably available in the distributor 3, in particular in the housing 31.

Preferably, therefore, the porous element is counter-formed apart from the seat 31 and removably disposed within the housing 31.

Thus, in the case where the seats 31 are multiple, the distributor 3 may comprise a plurality of porous elements insertable as tablets within the appropriate seats.

Advantageously, each seat 31 is adapted to accommodate the porous element in such a way that the latter is spaced apart from the distribution conduit 30. Preferably, particularly when the distributor 3 includes a plurality of distribution conduits 30, the seat 31 is configured to avoid adhesion between the filter media 4 and the distribution conduits 30.

Thus, in general, the seat 31 is configured to distance the filter means 32 and the distribution conduit 30 so as to achieve at least one separation space 33.

Preferably, the separation space 33 is a portion of free space between the porous element and the distribution conduit 30 defining a second thickness s2 along the extrusion direction 1a.

Preferably, the second thickness $s_2$ of the separation space 33 is preferably greater than or equal to 500 μm.

Even more preferably, the separation space 33 is between 500 μm and 8 mm.

Preferably, but not necessarily, the separation space 33 defines a thickness greater than or equal to the thickness of the porous element. The latter, in the preferred embodiment, defines a thickness of at least 1.5 mm. Even more in detail, preferably, the porous element 40 defines thicknesses between 1.5 mm and 8 mm.

In order to realise the separation between the filter means 32 and the inlet of the distribution conduit 30, the housing 31 may include at least one housing and support means.

The housing is preferably a portion of the housing 31 suitable for fully housing the porous element. Therefore, the latter is in particular counter-shaped to the housing.

Preferably, the support means are suitable to allow the porous element to rest on them in such a way that the latter remains within the housing spaced from the distribution conduit(s) 30.

Therefore, the support means may include a support frame, such as or other spacer elements capable of achieving at least the separation space 33.

The spinneret 4 is a separate element from the distributor 3, as in common spunbond installations.

Preferably, the spinneret 4 comprises a plurality of holes 40. Each of the holes 40 preferably runs parallel to the extrusion direction 1a.

Furthermore, each of the holes 40 is preferably in fluid passage connection with the distribution conduit 30 and suitable for extruding polymeric fluid to make a respective polymeric filament.

Appropriately, the holes 40 may have diameters that vary dimensionally depending on the use for which they are intended.

The plant 1 therefore also comprises a tank 5.

The tank 5 is essentially a tank, or chamber, of distribution.

In particular, the tank 5 receives polymeric fluid from the distributor 3 and conveys it to the holes 40 of the spinneret 4.

Therefore, the distribution tank 5 is realised between the distributor 3 and the spinneret 4.

In detail, the tank 5 is positioned downstream of the distribution conduit 30 and upstream of the holes 40.

Moreover, the tank 5 connects, in fluid passage connection, the distribution conduit 30 and the holes 40.

Tub 5 thus defines a first thickness $s_1$ along the extrusion direction 1a. Advantageously, the first thickness s1 is between 0.8 mm and 6 mm.

More specifically, the first thickness s1 can be between 3 mm and 5 mm.

For example, the first thickness $s_1$ may be approximately 4 mm.

From a structural point of view, the tank 5 may be positioned in the distributor 3 or in the spinneret 4 or defined by both.

As such, one of distributor 3 or spinneret 4 could comprise a cavity, similar to housing 31. Or, two mutually complementary cavities could be realised, defining, when distributor 3 and spinneret 4 are assembled, the tank 5.

The latter form of realisation is, for example, shown in FIG. 1.

The operation of the plant 1 for making spunbond type polymeric filament described above in structural terms is similar to that of ordinary plants.

However, the plant 1 for making spunbond type polymeric filament according to the invention achieves important advantages.

Indeed, the applicant has found that the adoption of a first thickness $s_1$ as described, i.e. between 3 mm and 5 mm, results in a reduction of droplets, exiting the holes 40 of the spinneret 4, of 50%.

Therefore, on the whole, plant 1 also enables a reduction in waste, which is approximately 30-40% lower than with common spunbond plants.

From the above advantages, it further follows that plant 1 is more environmentally friendly and economical.

The invention is susceptible to variations within the scope of the inventive concept as defined by the claims.

Within this scope, all details are substitutable by equivalent elements and the materials, shapes and dimensions may be any.

The invention claimed is:

1. A plant for making spunbond type polymeric filament defining an extrusion direction and comprising in order along said extrusion direction:

an extrusion head including at least one main channel suitable for allowing the passage of polymeric fluid through said extrusion head, a distributor being a breaker plate including at least one distribution conduit in fluid passage connection with said main channel and suitable for distributing said fluid, wherein the breaker plate includes a cavity and a filter, the cavity defining a distributor housing adjacent to said extrusion head and arranged between said main channel and said distribution conduit, and the filter housed and supported within said distributor housing;

at least one spinneret including a plurality of holes, each of the holes developing parallel to said extrusion direction in fluid passage connection with said distribution conduit and suitable to extrude said fluid to make a respective polymeric filament, at least one distribution tank realised between said distributor, downstream of said distribution conduit, and said spinneret, upstream of said holes, and connecting, in fluid passage connection, said distribution conduit and said holes, wherein said distribution tank defines a first thickness along said extrusion direction between 3 mm and 5 mm.

2. The plant according to claim 1, wherein said distributor housing is configured to distance said filter and said distribution conduit to achieve at least one separation space.

3. The plant according to claim 2, wherein said separation space defines a second thickness between 500 μm and 8 mm.

4. The plant according to claim 1, wherein said filter include a porous element defining a plurality of non-rectilinear and irregularly sized passageways.

5. The plant according to claim 4, wherein said porous element comprises a plurality of adjacent pores, defining said passageways, having a porosity greater than or equal to 18 μm.

6. The plant according to claim 4, wherein said porous element comprises a plurality of sintered particles.

7. The plant according to claim 4, wherein said porous element comprises metallic material.

8. The plant according to claim 4 wherein said polymeric fluid is selected from at least one member of the group polypropylene, polyester, nylon, cellulose, polyethylene, viscose and PLA.

9. The plant according to claim 1, wherein said first thickness is between 3 and 4 mm.

10. The plant according to claim 1, wherein said first thickness is between 4 and 5 mm.

11. The plant according to claim 1, wherein said extrusion head is a common distributor which is a coat hanger, and wherein said distributor is a breaker plate.

12. The plant according to claim 5, wherein said porous element comprises a plurality of sintered particles.

13. The plant according to claim 1, wherein said first thickness is between 3 and 5 mm, wherein said distributor comprises at least one housing adjacent to said extrusion head and arranged between said main channel and said distribution conduit and filtering means housed within said housing, wherein said housing is configured to distance said filter means and said distribution conduit so as to achieve at least one separation space, wherein said separation space defines a second thickness between 500 μm and 8 mm, wherein said filtering means include a porous element defining a plurality of non-rectilinear and irregularly sized passageways, wherein said porous element comprises a plurality of adjacent pores, defining said passageways, having a porosity greater than or equal to 18 μm, wherein said porous element comprises a plurality of sintered particles, wherein said porous element comprises metallic material.

14. The plant according to claim 13, wherein said polymeric fluid is selected from at least one member of the group polypropylene and polyethylene.

15. The plant according to claim 13, wherein said polymeric fluid is selected from at least one member of the group polyester, nylon, cellulose, viscose and PLA.

16. The plant according to claim 1, wherein said main channel of said extrusion head defines:

a vertical inlet channel having an upstream end and a downstream end, first and second intermediate channels that each have an inlet end and a discharge end, and a transverse lower channel having opposed first and second inlet ends and a discharge opening between said opposed first and second inlet ends, wherein the vertical inlet channel downstream end is in fluid communication with the first intermediate channel inlet end and the second intermediate channel inlet end, wherein the first intermediate channel discharge end is in fluid communication with the transverse lower channel first inlet end, wherein the second intermediate channel discharge end is in fluid communication with the transverse lower channel second inlet end, wherein the first and second intermediate channels and the transverse lower channel define a flow path shaped as an isosceles triangle having legs and a base for the passage of polymeric fluid through said extrusion head, wherein the first intermediate channel and the second intermediate channel are the legs of the isosceles triangle, and the transverse lower channel is the base of the isosceles triangle; and wherein said distributor is a breaker plate.

17. The plant according to claim 16, wherein said distribution tank is positioned in the distributor and/or in the spinneret as a cavity defined by the distributor and/or the spinneret.

18. The plant according to claim 1, wherein said distribution tank is positioned in the distributor and in the spinneret as a cavity defined by complimentary cavities of the distributor and the spinneret.

* * * * *